United States Patent
Hartney et al.

(10) Patent No.: US 9,517,894 B2
(45) Date of Patent: Dec. 13, 2016

(54) FLOATING CONVEYOR BELT CLEANER ASSEMBLY

(71) Applicant: RULMECA CANADA LIMITED, Wallaceburg (CA)

(72) Inventors: Joseph Hartney, Wallaceburg (CA); Lucas Morse, Wallaceburg (CA); Christopher Duchene, Tuppeville (CA); Jocelin Boyer, Wallaceburg (CA); William Benedict, Chatham (CA)

(73) Assignee: RULMECA CANADA LIMITED, Wallaceburg, Ontario (CA)

( * ) Notice: Subject to any disclaimer, the term of this patent is extended or adjusted under 35 U.S.C. 154(b) by 0 days.

(21) Appl. No.: 14/884,118

(22) Filed: Oct. 15, 2015

(65) Prior Publication Data

US 2016/0107843 A1    Apr. 21, 2016

Related U.S. Application Data

(60) Provisional application No. 62/064,114, filed on Oct. 15, 2014.

(51) Int. Cl.
   *B65G 45/12*    (2006.01)

(52) U.S. Cl.
   CPC .................. *B65G 45/12* (2013.01)

(58) Field of Classification Search
   CPC .......... B65G 45/12; B65G 45/14; B65G 45/16
   USPC ........................................ 198/497, 498, 499
   See application file for complete search history.

(56) References Cited

U.S. PATENT DOCUMENTS

| | | | | |
|---|---|---|---|---|
| 1,330,967 A | * | 2/1920 | Winters | B65G 45/14 139/1 C |
| 3,315,794 A | * | 4/1967 | Ellington | B65G 45/12 198/499 |
| 4,036,351 A | * | 7/1977 | Reiter | B65G 45/16 137/124 |
| 4,202,437 A | | 5/1980 | Gordon | |
| 4,344,525 A | * | 8/1982 | Bancroft | B65G 45/12 198/497 |
| 4,787,500 A | | 11/1988 | Holz | |
| 4,836,356 A | * | 6/1989 | Mukai | B65G 45/16 15/256.5 |
| 4,969,553 A | | 11/1990 | Stoll | |
| 5,218,412 A | | 6/1993 | Martin | |
| 6,056,111 A | * | 5/2000 | Stoll | B65G 45/12 198/497 |
| 8,556,064 B2 | | 10/2013 | Smith et al. | |
| 2014/0238822 A1 | * | 8/2014 | Smith | B65G 45/12 198/497 |

* cited by examiner

*Primary Examiner* — William R Harp

(57) ABSTRACT

A floating conveyor belt cleaner assembly for removing residual material on the surface of a conveyor belt has a scraper assembly with a plurality of scraper blades rotatably mounted between mounting frames attached to the support structure of a conveyor belt adjacent the opposing edges of the belt. A rotating mechanism selectively rotates the scraper assembly relative to the mounting frames to position a new set of scraper blades against the conveyor belt once the worn set of scraper blades requires replacement. A float mechanism permits movement of the scraper assembly vertically substantially perpendicular to the surface of the belt as the scraper blades wear down.

11 Claims, 7 Drawing Sheets

FLOATING CONVEYOR BELT CLEANER ASSEMBLY

FIELD OF THE INVENTION

The present invention relates to conveyor belt cleaners.

BACKGROUND

Conveyor belt systems are widely used in a diverse set of industrial and commercial applications. In some applications, conveyor systems are used to transport material that adheres to and does not readily detach from the surface of the conveyor belt, requiring the use of scraping devices, called belt cleaners. These devices typically operate by pressing a scraper blade against the conveyor belt, as it travels, to remove any material adhering to the surface of the belt.

The removal of residual material on the surface of the conveyor belt is particularly important in belt-type conveyor systems that use one set of top rollers to support the conveyor belt as it travels to its destination, and another set of bottom rollers, below the first set, that support the conveyor belt as it loops back around to make its return trip. The top rollers support the conveyor belt on the underside of the belt which is not in contact with the material being transported. The bottom rollers, or return rollers, support the belt from the top side of the belt on which the material was transported. Any residual material left on the top surface of the belt can clog the roller mechanisms, damage the surface of the return rollers, or result in poor tracking of the belt.

Industrial operations, such as mining or other resource extraction operations, rely on conveyor belt systems to move large quantities of heavy material between processing steps in the operation. Many of these operations produce low-cost resources and depend on large high-speed conveyor belt systems to provide the high throughput necessary to make the operation profitable. In these operations, machine maintenance, including maintenance of the conveyor belt systems, and the resulting downtime, is carefully planned and scheduled to maximize productivity and, thus, profitability of the operation.

Especially in mining or resource extraction operations, the belts are very large and are an expensive component of the conveyor belt system. In order to minimize wear on the belt itself, belt cleaners are equipped with elastomeric scraper blades, designed to remove the residue material from the surface of the belt. As a result, the scraper blades wear down.

Wear is a significant problem for certain parts in a conveyor belt system, such as the scraper blades, and can lead to costly unscheduled downtime as a result of wear-related unserviceability. If left without maintenance, the belt may begin to track off center, which may create additional problems with the conveyor system. When a conveyor belt system requires scheduled or unscheduled maintenance, it often requires all associated processes to be shut down until the conveyor belt system is once again operational and serviceable. The financial cost, associated with a process-wide shutdown, can be high.

Accordingly, there is a need for a conveyor belt cleaner that minimizes scheduled or unscheduled downtime of conveyor belt systems, due to wear-related replacement of parts, such as scraper blades.

SUMMARY OF THE INVENTION

According to one aspect of the present invention a floating belt cleaner is provided, having first and second opposed mounting frames, attached to the support structure of a conveyor belt, adjacent to the opposing edges of the belt. A scraper assembly having scraper blades extending upwardly and downwardly therefrom is rotatably mounted between the first and second frames.

In another embodiment, the two mounting frames are longitudinally offset from one another along the belt, so as to position the scraper blade at an angle to the longitudinal motion of the conveyor.

BRIEF DESCRIPTION OF THE DRAWINGS

In order that the invention may be more clearly understood, preferred embodiments thereof will now be described in detail, by way of example, with reference to the accompanying drawings, in which.

DESCRIPTION OF THE PREFERRED EMBODIMENT

Figure 1:
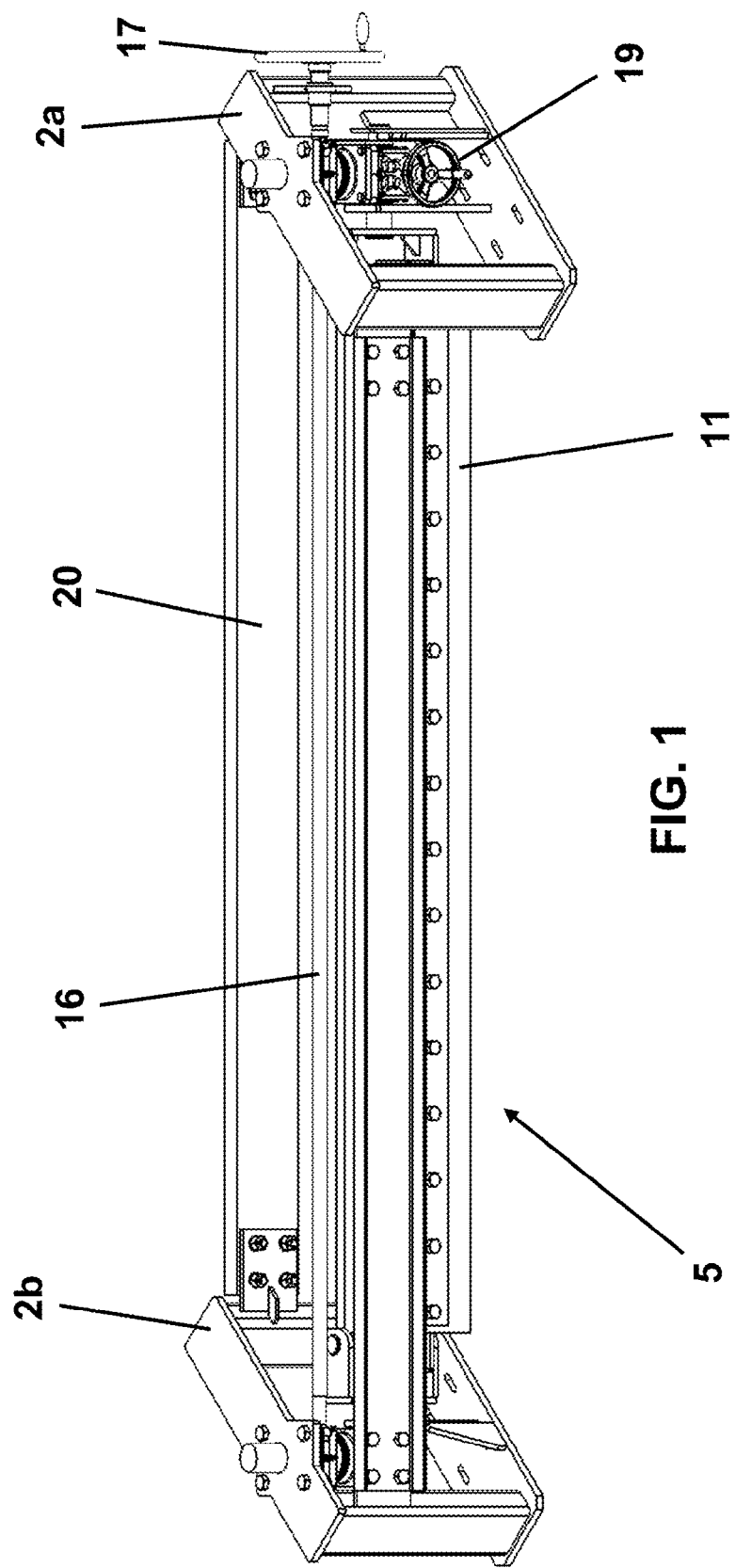
FIG. 1 is a perspective view of the floating belt cleaner according the present invention.
Figure 2A:
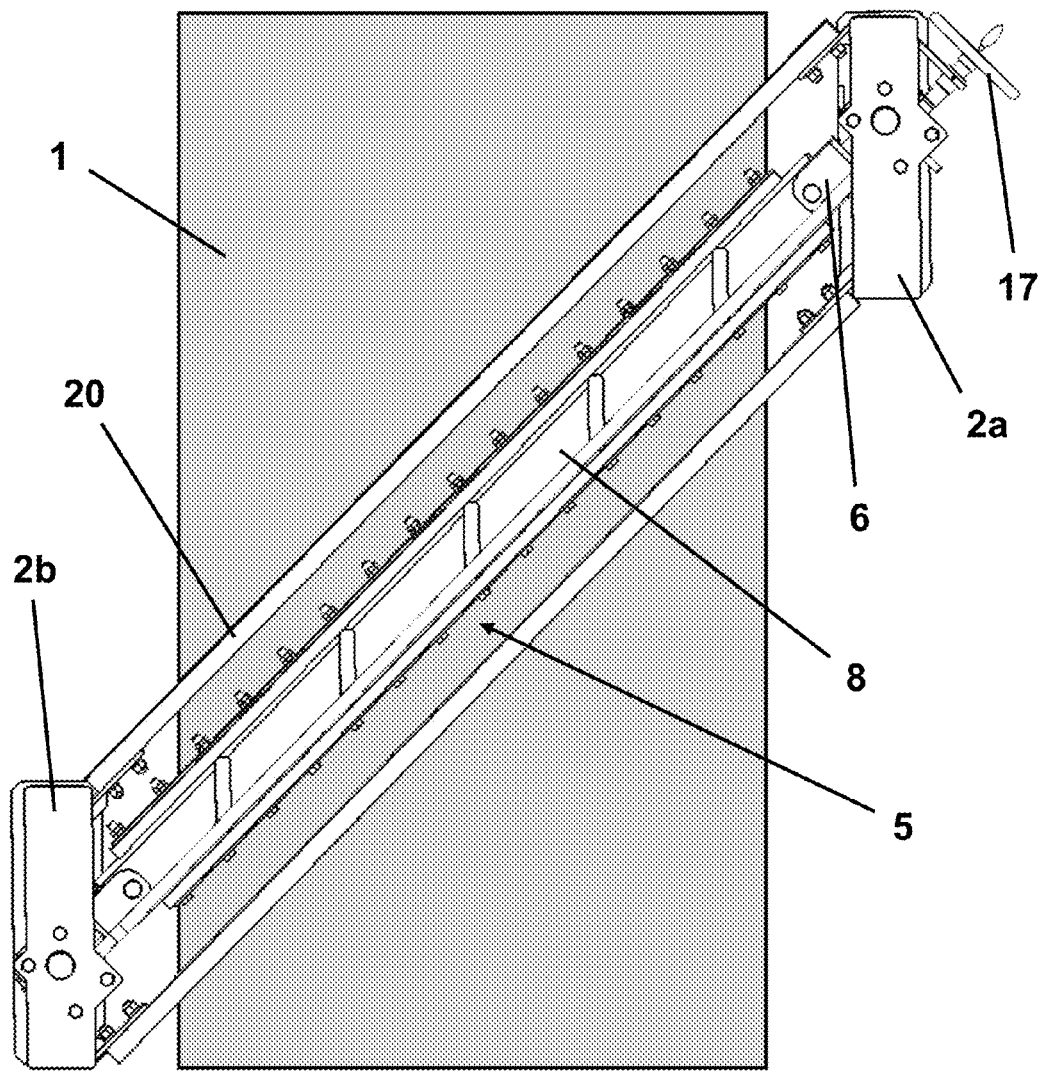
FIG. 2A is a top view of the belt cleaner, showing the underlying conveyor belt.
Figure 2B:
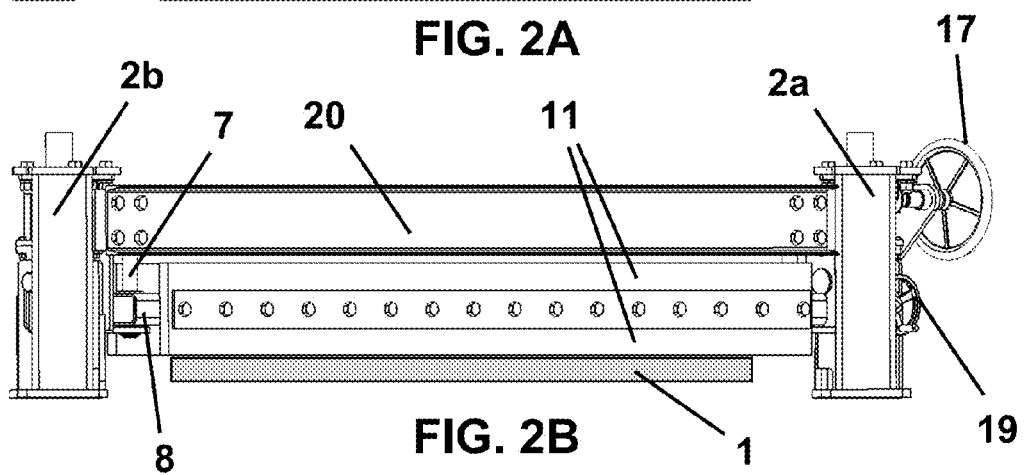
FIG. 2B is a side view of the belt cleaner, showing the underlying conveyor belt.

A preferred embodiment of the floating belt cleaner, according to the present invention, is shown in FIGS. 1, 2A, and 2B. The belt cleaner has two mounting frames 2, rigidly attached to the adjacent support structure of a belt-type conveyor system (not shown), on either side of the belt 1. Preferably, the frames 2 are longitudinally offset from one another along the belt 1, as shown in FIG. 2A, to angle the scraper blades 11 to direct any residual material on the surface of the belt 1 to one side or the other. The frames 2 have two horizontal members 3 and two vertical members 4, defining a hollow, generally rectangular shape. Where space around the conveyor is limited, at least the first frame 2a is located on an accessible side of the belt 1 for servicing access as will be described hereinafter. The second frame 2b may or may not be accessible.

Figure 5:
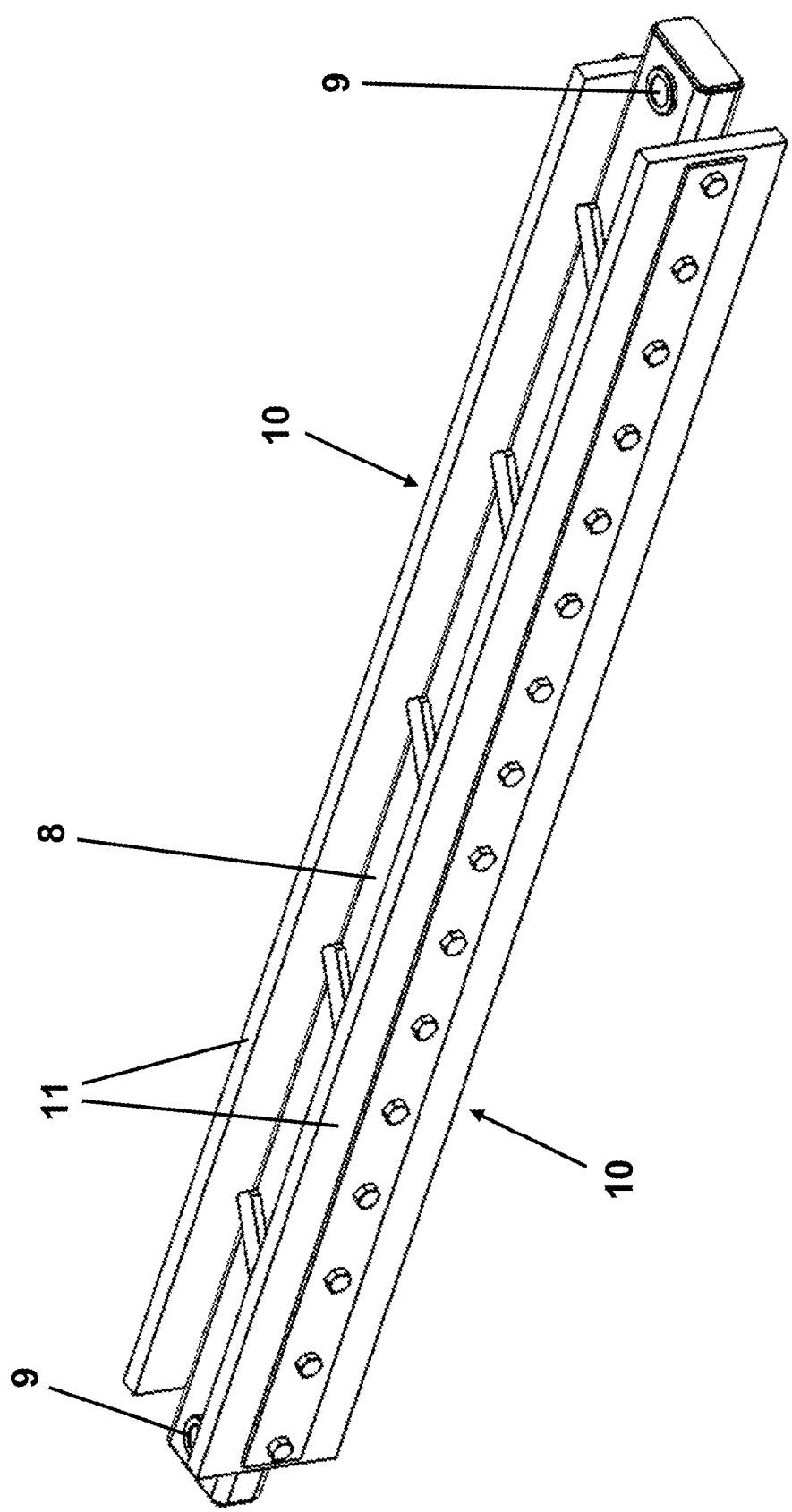
FIG. 5 is a perspective view of the scraper mounting frame with scraper blades attached.
Figure 6:
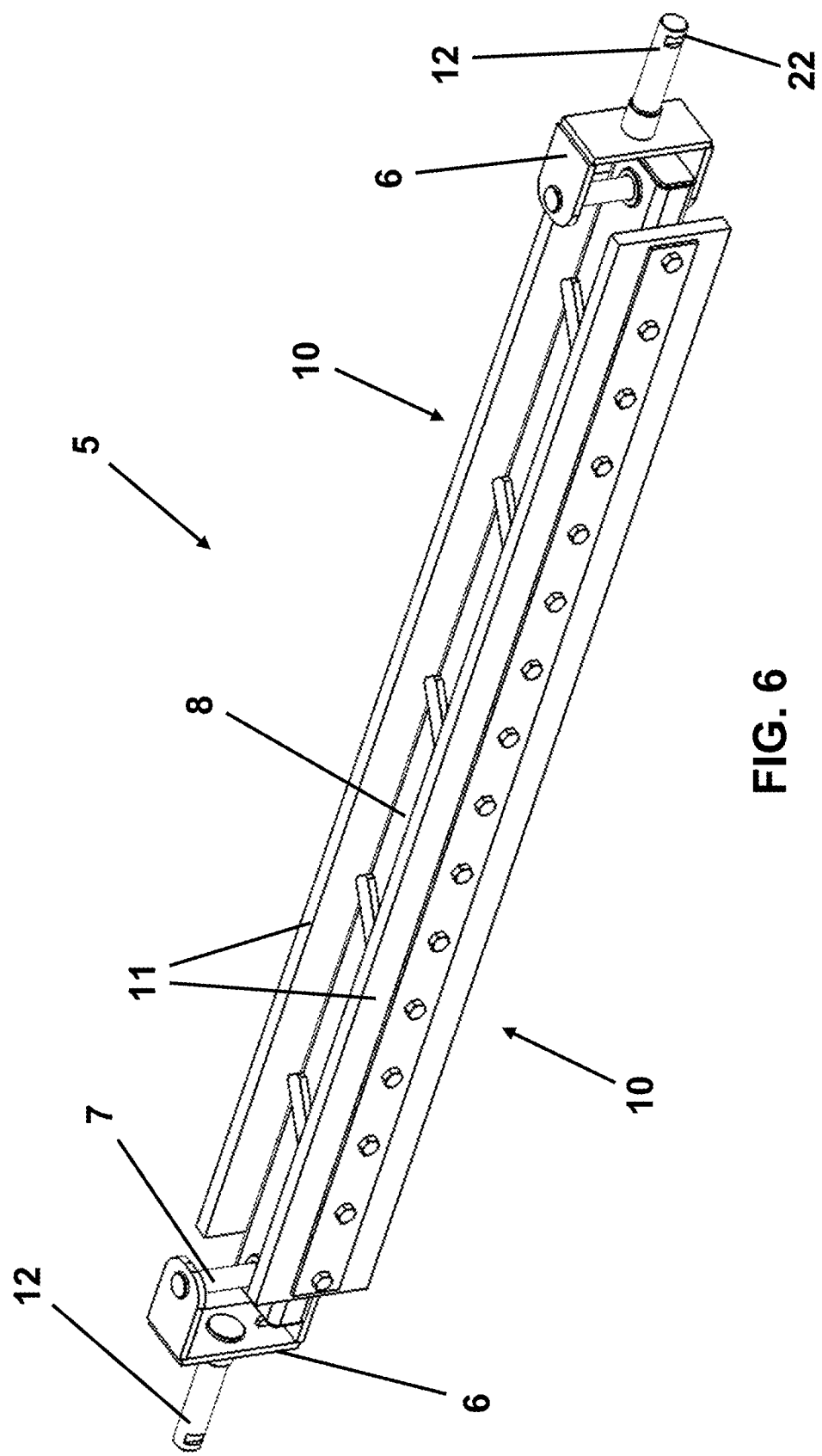
FIG. 6 is a perspective view of the scraper assembly, including the scraper mounting frame and scraper blades in the same orientation as shown in FIG. 5.
Figure 7A:
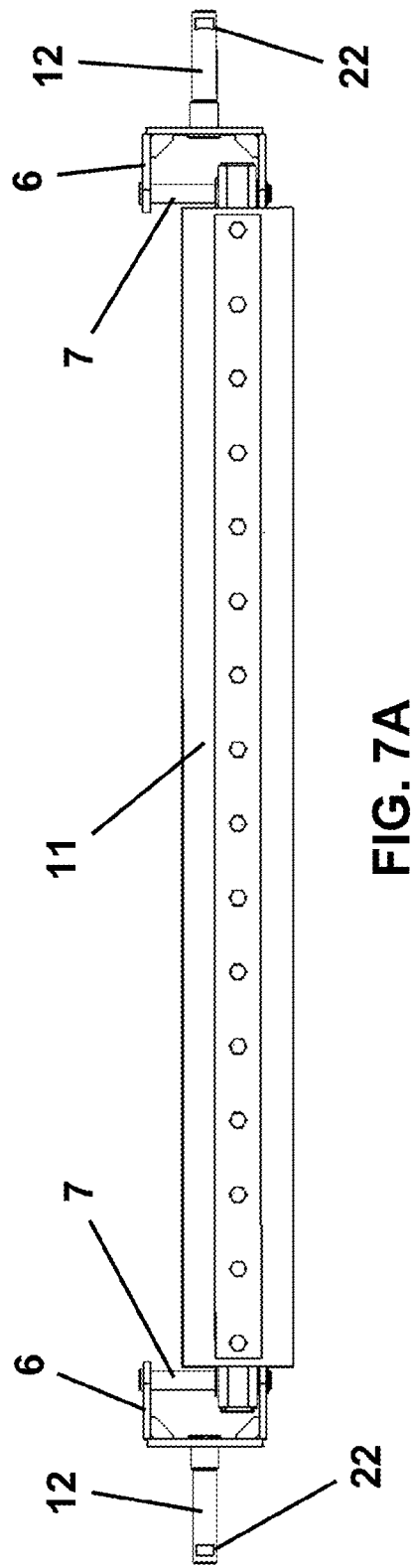
FIG. 7A is a side view of the scraper assembly.
Figure 7B:
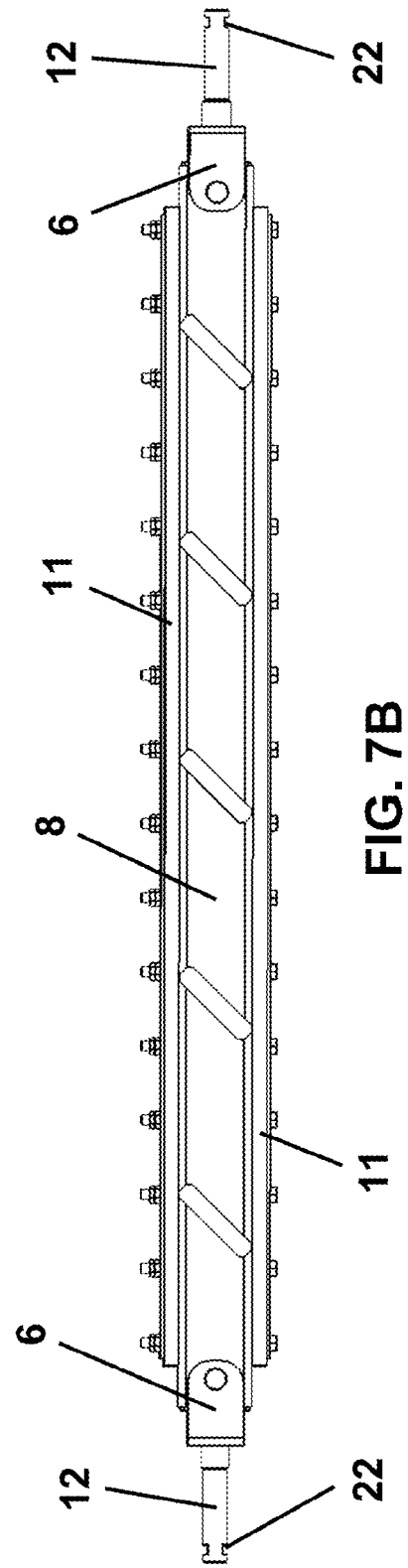
FIG. 7B is a top view of the scraper assembly.

As shown in FIGS. 1, 2A, and 2B, a scraper assembly 5 is mounted on the first and second frames 2a and 2b, and is rotatable about its longitudinal axis. As shown in FIGS. 6, 7A, and 7B, the scraper assembly 5 has two C-shaped brackets 6. A float post 7 is attached between the top and bottom of each C-shaped bracket 6. As shown in FIG. 5, the scraper assembly 5 has a scraper mounting frame 8 and scraper blades 11 attached on scraper blade assemblies 10. The scraper mounting frame 8 is installed between the C-shaped brackets 6, by means of apertures 9 at each end of the scraper mounting frame 8 that slidably fit about the float posts 7. The scraper mounting frame 8 is preferably a generally rectangular box-shaped frame. Vertical compliance, or "float", in the position of the scraper assembly 5, with reference to the conveyor belt 1, is enabled by the free movement of the scraper mounting frame 8 upwardly and downwardly on the float posts 7, as the scraper blades 11 ride on the surface of the conveyor belt 1. The weight of the scraper assembly 5 maintains operative contact between the scraper blade edges and the belt 1 as the scraper blades 11 progressively wear down. Alternatively, the scraper assembly 5 may be biased against the belt 1, by a mechanism such as a spring and damper suspension system.

As shown in FIG. 5, two double-sided blade assemblies 10 are mounted on opposing sides of the scraper mounting frame 8. The blade assemblies 10 each have a scraper blade 11 that extends both upwardly and downwardly from the scraper mounting frame 8 and is bolted to the scraper mounting frame 8 along its centre line. Alternatively, single-sided scraper blades (not shown) may be mounted to each side of the scraper mounting frame 8, one extending upwardly and one extending downwardly. The edges of the scraper blades 11 engage with the surface of the belt 1, as shown in FIG. 2B, and progressively wear down. Preferably, two parallel blade assemblies 10 are mounted on either side of the scraper mounting frame 8, but other configurations of blade assemblies 10 are possible, such as, for example, a single blade assembly 10.

Figure 3:
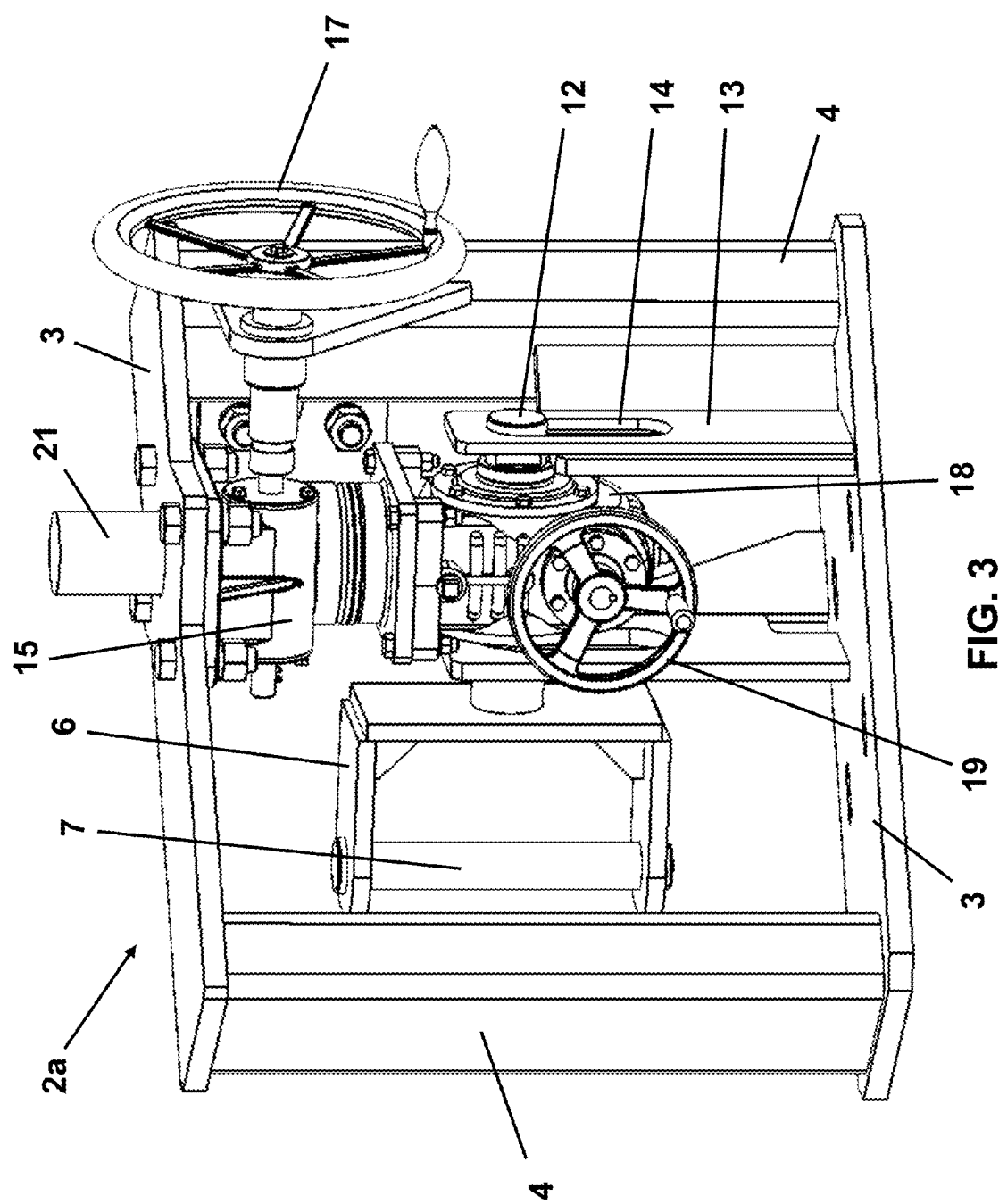
FIG. 3 is a perspective view of the first frame of the belt cleaner.
Figure 4:
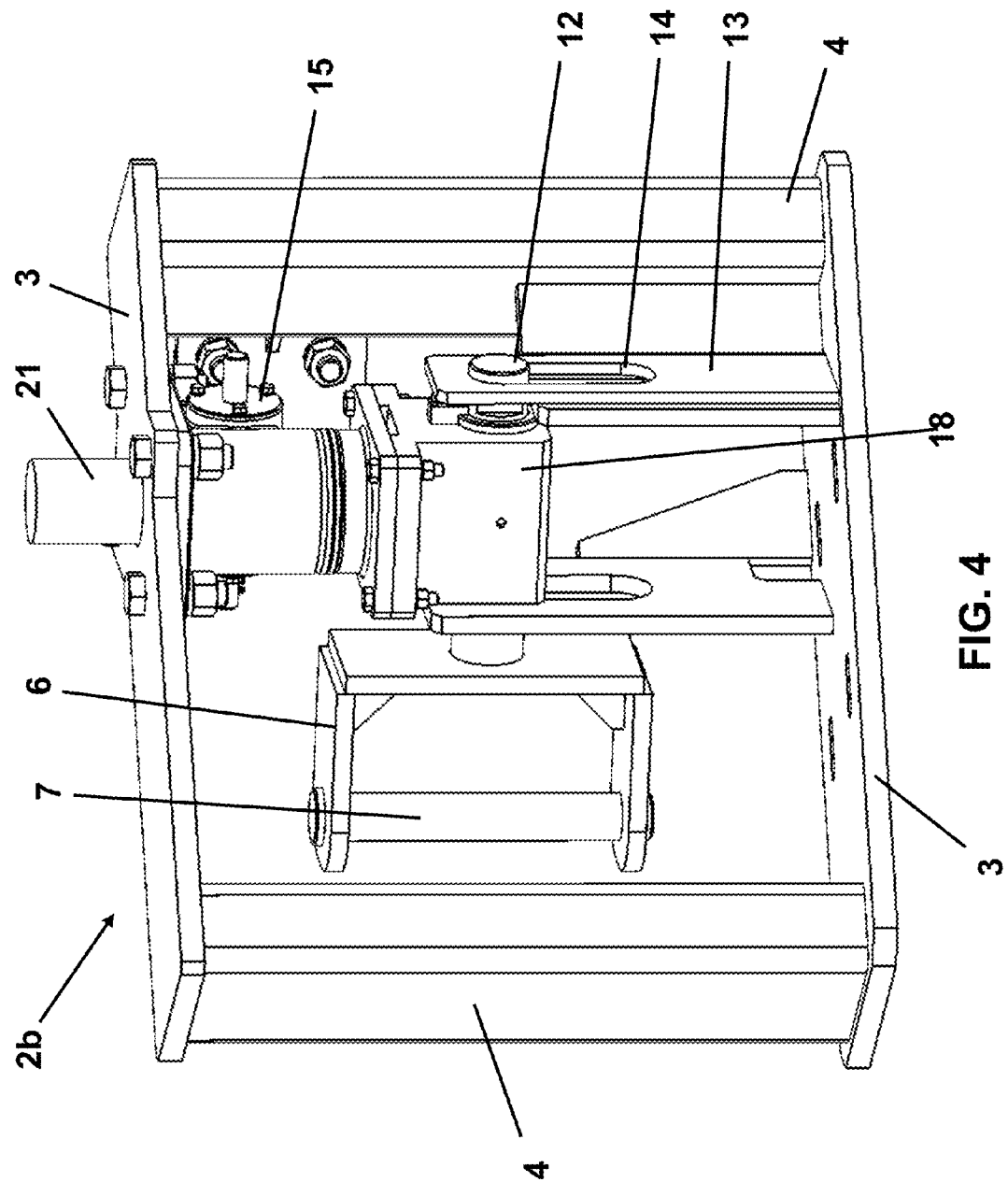
FIG. 4 is a perspective view of the second frame of the belt cleaner.

As shown in FIG. 6, the scraper assembly 5 has two shafts 12 that extend outwardly from the C-shaped brackets 6 at either end of the scraper assembly 5. As shown in FIGS. 3 and 4, the shafts 12 are mounted at each end on support members 13, rigidly attached to the frame. Each support member 13 has a vertically aligned slot 14 to receive and hold the shaft 12 therein during normal operations. The slot 14 is tapered, such that it is wider than the diameter of the shaft 12 at the top and narrower than the diameter of the shaft 12 at the bottom. As a result, the shaft 12 is ordinarily wedged or locked in the slot 14 at the lowermost position, but is free to rotate within the slot 14 when raised to the uppermost position. Raising the shaft 12 to the uppermost position, shown in FIGS. 3 and 4, unlocks or releases the securement of the shaft 12 in the slot 14.

To facilitate the locking of the shafts 12 in the slots 14, the shafts 12 have a notched portion 22, near the ends thereof, as shown in FIG. 6. The notched portions 22 align and fit within the side edges of the slot 14 at the narrow bottom thereof. During operations, the shafts 12 are ordinarily locked in the slot 14 to prevent egress or rotation.

To rotate the blade assembly, the shafts must be unlocked and raised to permit rotation thereof 180°. This is accomplished by means of a gear housing 18 rotatably mounted on the shafts 12, located between the support members 13 on each frame 2a and 2b. Each gear housing 18 has a vertical extension 21 passing through the top horizontal member 3 of the frame 2a or 2b. First worm drives 15 on each vertical extension 21 are connected by a crank shaft 16 and operatively engaged with a first crank wheel 17. The first crank wheel 17 operates both first worm drives 15 to raise and lower the gear housings 18. Once raised and unlocked, the scraper assembly 5 is rotated by means of a second worm drive in the gear housing 18, which is operatively engaged with a second crank wheel 19 and rotates the shaft 12 and the scraper assembly 5 therewith. Optionally, only one gear housing 18 is provided with a second worm gear and second crank wheel 19.

Preferably, two guard rails 20 extend across the belt 1 between the vertical members 4 and are spaced vertically above the belt 1. The guard rails 20 are rigidly attached to the vertical members 4, for example by bolting them to the vertical members 4 or to flanges that extend therefrom.

The scraper blades 11 are preferably made of an elastomer, such as a polyurethane or other suitable polymer. Blends or layered configurations of different materials may also be used in the scraper blades 11. Rigid or metallic scraper blades 11 are not preferred, because they cause increased wear to the belt 1.

During operation, the scraper assembly 5 is lowered until the downward facing edges of the scraper blades 11 are in contact with the belt 1 and the scraper mounting frame 8 is positioned between the ends of the float posts 7. These downwardly facing edges of the scraper blades 11 will experience wear and eventually require replacement. When the scraper blades 11 are worn down and replacement becomes necessary, the floating belt cleaner, according to the present invention, permits an operator to rapidly and efficiently replace the worn scraper blades 11 by first raising the scraper assembly 5, by turning the first crank wheel 17, then rotating the scraper assembly 5 through 180° by turning the second crank wheel 19, and then lowering a fresh set of scraper blades 11 onto the belt 1 by turning the first crank wheel 17 in the opposite direction.

Having a scraper assembly 5 with scraper blades 11 extending upwardly and downwardly, according to the present invention, in place of a scraper assembly 5 with scraper blades 11 extending in only one direction therefrom, minimizes downtime by permitting rapid and efficient replacement of worn scraper blades 11. Although the floating belt cleaner of the present invention has been described with two sets of scraper blades 11, the scraper mounting frame 8 may be configured with scraper blades 11 extending in three or more directions, to provide additional replacement sets of scraper blades 11. The longevity of each set of scraper blades 11 and the number of replacement sets of scraper blades 11 may be selected such that the last replacement set of scraper blades 11 will not wear out between periods of scheduled downtime in any given operation. This permits the worn scraper blades 11 on the scraper assembly 5 to be replaced without requiring additional, unscheduled downtime.

A number of embodiments of the present invention have been described. Nevertheless, it will be understood that various modifications may be made without departing from the spirit and scope of the invention described herein.

What is claimed is:

1. A floating belt cleaner comprising a first and second opposed mounting frames attached to a support structure of an operational conveyor belt adjacent the opposing edges of a belt, a scraper assembly having a frame and a plurality of scraper blades attached to the frame, the scraper assembly being rotatably mounted between the first and second mounting frames, a rotating mechanism operatively engaged with the scraper assembly to selectively rotate the scraper assembly relative to the first and second mounting frames while the conveyor belt is operational, a locking mechanism to secure the scraper assembly against rotation relative to the first and second mounting frames, wherein the scraper assembly is mounted between the first and second mounting frames by way of a float mechanism which permits movement of the scraper assembly vertically substantially perpendicular to the surface of the belt.

2. The floating belt cleaner of claim 1, further comprising a lifting mechanism operatively engaged with the scraper assembly to selectively raise and lower the scraper assembly relative to the conveyor belt.

3. The floating belt cleaner of claim 2, wherein the float mechanism comprises two C-shaped brackets having a float post attached between the top and bottom of each C-shaped bracket and two apertures at each end of the frame, wherein the scraper assembly is mounted between the C-shaped brackets by way of the two apertures which slidably fit about the float posts.

4. The floating belt cleaner of claim 3, wherein the scraper assembly moves freely on the float posts.

5. The floating belt cleaner of claim 3, wherein the scraper assembly is biased along the float posts against the belt.

6. The floating belt cleaner of claim 3, wherein the scraper assembly has two double-sided scraper blades attached to the frame.

7. The floating belt cleaner of claim 3, wherein the locking mechanism comprises a shaft extending outwardly from each of the two C-shaped brackets at either end of the scraper assembly and a vertically aligned slot in each of the first and second opposed mounting frames shaped to receive and hold the shaft therein, wherein at least one of the slots is tapered such that it is wider than the diameter of the shaft at the top and narrower than the diameter of the shaft at the bottom.

8. The floating belt cleaner of claim 7, wherein at least one of the shafts has a notched portion near the end thereof that is aligned and fits within the side edges of the at least one tapered slot at the narrow bottom thereof, thereby permitting the shaft to rotate freely within the slot when the shaft is in the uppermost position within the slot and locking the shaft against rotation within the slot when the shaft is in the lowermost position within the slot.

9. The floating belt cleaner of claim 8, wherein the lifting mechanism comprises a gear housing rotatably mounted on each of the shafts, wherein each gear housing has a vertical extension passing through the top of the first or second mounting frame, and a worm drive attached to each of the first and second mounting frames, wherein the worm drives are engaged with the vertical extensions and operatively engaged with a first crank to raise and lower the gear housings.

10. The floating belt cleaner of claim 9, wherein the rotating mechanism comprises a second worm drive attached to one of the gear housings, wherein the second worm drive is engaged with one of the shafts and operatively engaged with a second crank to rotate the shaft and the scraper assembly therewith.

11. The floating belt cleaner of claim 1, wherein the first and second opposed mounting frames are longitudinally offset from one another along the conveyor belt.

* * * * *